Dec. 7, 1948.      F. E. B. FOLEY      2,455,859
ARTIFICIAL SPHINCTER AND METHOD
Filed May 13, 1946      2 Sheets-Sheet 1
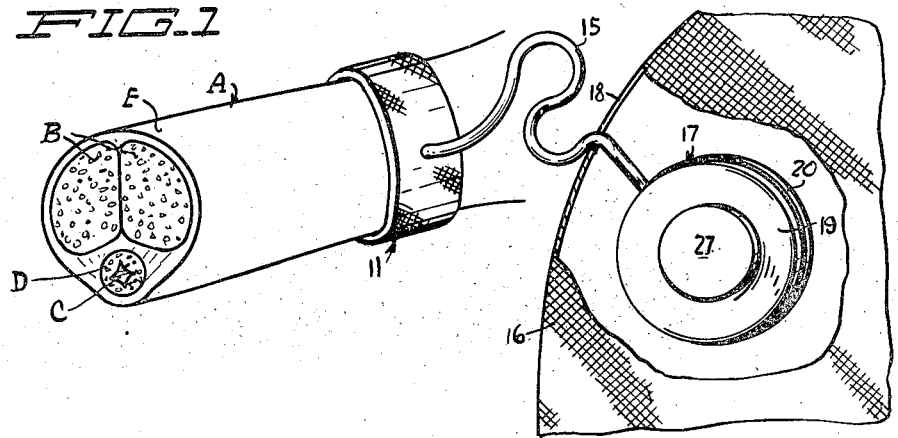
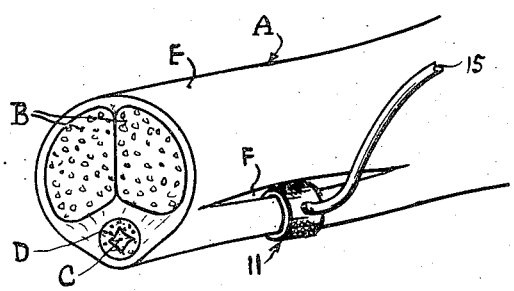
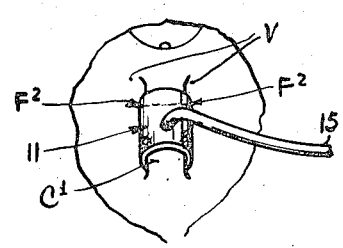
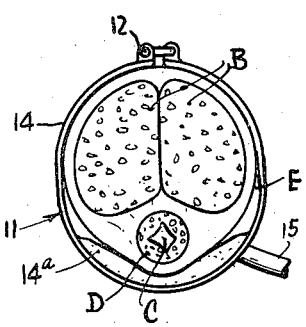 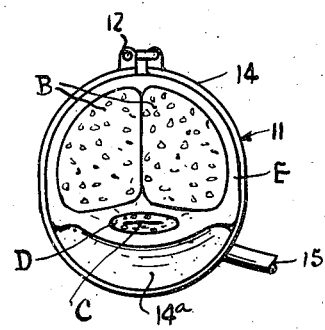
Inventor
FREDERIC E. B. FOLEY
By Carlsen + Hagle
Attorneys Dec. 7, 1948.   F. E. B. FOLEY   2,455,859
ARTIFICIAL SPHINCTER AND METHOD
Filed May 13, 1946   2 Sheets-Sheet 2

Inventor
FREDERIC F. B. FOLEY
By Carlsen + Hagh
Attorneys

Patented Dec. 7, 1948

2,455,859

UNITED STATES PATENT OFFICE 2,455,859

ARTIFICIAL SPHINCTER AND METHOD

Frederic E. B. Foley, St. Paul, Minn.

Application May 13, 1946, Serial No. 669,218

6 Claims. (Cl. 128—346)

This invention relates to apparatus and method for controlling involuntary escape of urine occurring as functional involuntary urination or as urinary incontinence of organic cause and the primary object is to provide means of a novel, efficient, sanitary, and practical nature for controlling the discharge of urine in people suffering from this dreadful affliction.

Involuntary escape of urine in men, women and children occurring as a functional disturbance of urination or as urinary incontinence occasioned by anatomic or neurologic incompetence of sphincter muscles presents no new or inconsequential problem. The condition inflicts great discomfort and distress upon the unfortunate victim and is a problem with which the medical and surgical profession has made little progress in reaching a satisfactory solution. The present invention constitutes a substantial advance in the art, and actual test cases have definitely established its merits and practical value.

Involuntary escape of urine due to functional disturbance, of which the nocturnal enuresis or bed wetting of children is an example, is usually temporary and disappears with advancing age or with correction of the responsible functional disturbance. In such cases only temporary measures for relief of the condition are necessary. Involuntary escape of urine due to anatomic abnormality of the sphincters or disturbance of their innervation may be temporary or permanent conditioned upon the nature of the responsible lesion. Depending upon the permanent or temporary nature of the condition permanent or only temporary measures are required for relief.

Previous means of meeting this serious and difficult problem have included: (A) collecting in a container the urine issuing from the urethra, (B) diverting the urinary flow by surgical procedures above the level of the urethra, and (C) controlling the involuntary flow of urine through the urethra by mechanical compression of the penis and contained urethra.

Among the aforementioned methods has been collection of the urine escaping directly from the urethra in absorbable material worn in the clothing or in a rubber urinal worn by the affected person. Such absorbable material or a wearable rubber urinal have many objectionable features including irritation of the skin, subjective discomforts, malodorousness, unsanitariness, and inconvenience.

Another method has been collection of the urine through an indwelling catheter retained in the urethra and connected to a wearable urinal. Here too the procedure and apparatus are far from satisfactory being extremely troublesome and requiring constant attention, or the indwelling catheter may not be tolerated.

Among the surgical procedures for diversion of the urine above the level of the urethra, only diversion of urine into the intestine by anastomosis of the ureters with the bowel has yielded greater comfort and convenience to the patient than previous methods of control, care and management of involuntary escape of urine from the urethra. Bilateral uretero-intestinal anastomosis of this sort is a formidable and dangerous operation and not infrequently is followed by fatal renal infection or renal functional impairment. The other methods for diversion of the urine above the level of the urethra merely establish a cutaneous urinary fistula from kidney, ureter or bladder. Available methods for control and collection of the urine escaping from such a fistula impose on the patient no less trouble or discomfort than previous methods available for the control and collection of urine involuntarily escaping from the urethra.

Another method of caring for involuntary urination and urinary incontinence in male subjects has been the mechanical compression of the penis and its contained urethra. The most popular device for this purpose has been the so-called Cunningham incontinence clamp consisting of two hinged jaws which are placed across the penis and compress all of the structures of the penis including its erectile bodies as well as its contained urethra.

Meritorious as the Cunningham incontinence clamp is, it too has serious objections; it is cumbersome, large, heavy, and cannot be worn with comfort. It is particularly objectionable in its production of partial erection distal to the site of application.

My invention completely eliminates most of the objections inherent in other methods. It involves use of a very simple device or apparatus and a very simple surgical operation, or in males the device may be used without requiring surgical interference.

The operation, when performed, consists, essentially, of surgical isolation or separation of a longitudinal section or segment of the male or female urethra from its adjacent tissues and then applying to the isolated segment of the urethra a fluid activated clamping ring that is remotely controlled by a device carried in a pocket or other container affixed to the clothing; or the fluid activated clamping ring is applied to the intact penis and its contained urethra. In this manner the flow of urine from the urethra can be easily controlled to produce what to all outward appearance is normal urination; and the device has none of the objections referred to above as being present in the previous forms of incontinence clamp.

In the accompanying drawings which illustrate a preferred embodiment of the invention—

Fig. 1 is a plan elevation of my device showing one end thereof as applied to an intact penis and its contained urethra and the opposite end with its control unit placed in the trouser pocket of the user.

Fig. 2 is a plan elevation of a portion of my device showing the collar end thereof as applied to a section of male urethra surgically separated from the penis.

Fig. 3 is a plan elevation showing one end of the device applied to a section of female urethra the device surgically separated from structures ventrally adjacent to it.

Fig. 4 is an enlarged detail view of the urethral clamping ring applied to the intact penis and its contained urethra the clamp deflated to permit normal open passage condition of the urethra, shown in section.

Fig. 5 is a detail view similar to Fig. 4 but showing the clamping ring inflated to compress the urethra and thus shut off the flow of urine therethrough.

Figure 6:
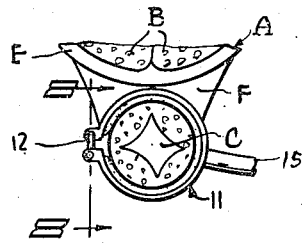
Fig. 6 is an enlarged detail view of the urethral clamping ring applied to the surgically isolated urethra, with the clamp deflated to permit normal open passage condition of the urethra, shown in section.

Referring to the drawings more particularly and by reference characters, A designates a section of the penile organ which includes the corpora cavernosa B, the urethra C contained within the corpus spongiosum D, and the outer envelope or surrounding skin E.

In surgically preparing the male urethra for use of my control mechanism, a segment of the urethra is separated from the main body portion of the penis, and this is done by providing a cutaneous tunnel F (see Fig. 2) at a point extending forward from the penoscrotal junction. While the procedure or technique of this operation need not here be set forth in detail it may be noted that the operation consists essentially of, inserting a sound in the urethra to stretch it and the surrounding corpus spongiosum, making the incision at each side, separating the corpus spongiosum from the corpora cavernosa between the opposite incisions, bringing the dorsal edges of the skin together about the corpora cavernosa and there suturing them together, and finally bringing the ventral edges of the skin incisions around the corpus spongiosum and suturing the same. The length of the skin incisions should be about twice the length desired for the cutaneous tunnel because contraction in the repair and healing process considerably shortens the length of the original opening.

The surgical operation on the female urethra to the same purpose as that described for the male is, of course, quite different, being governed by the different anatomic relationships of the urethra. In the female, as shown in Fig. 3, a paraurethral incision is made in the vaginal wall V on each side of the urethra C1; the urethra is separated from adjacent structures ventral to it and a mucosal tunnel F2, isolating a segment of the urethra, is formed by approximation of the medial edges of the mucosal incisions around the urethra and approximation of the lateral edges of the mucosal incisions ventral to the urethra between it and the pubic arch.

The artificial sphincter 11, which, in the male, is applied to the whole structure of the penis and its contained urethra, or to the isolated segment of either the male or female urethra, of course will be of size appropriate to the size of the penis or the isolated section of the urethra and its integument to which it is applied.

Figure 8:
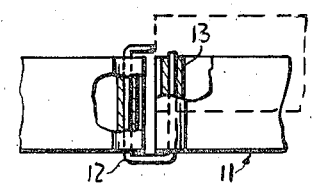
Fig. 8 is a detail section on line 8—8 in Fig. 6, illustrating the clamping ring releasable connecting device.

The split ring or collar of the artificial sphincter is made of light flexible material such as latex rubber. The ends of the collar are releasably secured together by a substantially U-shaped clip 12, one arm of which is secured in one end of the collar while the other arm of which is free to be inserted and removed from a metal sleeve 13 embedded in the other or adjacent end of the collar. It will thus be seen, and with particular reference to Fig. 8, that it is a very simple matter for the patient to secure and remove the collar.

The main body or peripheral wall 14 of the collar 11, while quite flexible, is rendered non-stretchable or non-distensible by imbedding fabric in the latex. Upon the inner side of the wall 14, however, there is a thin lining or layer of latex 14a which is tight at its edges and is stretchable so that it can be distended or inflated by air or other fluid supplied thereto.

Figure 9:
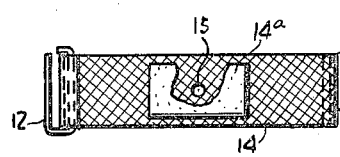
Fig. 9 is an inside elevation of the clamping ring for use on the intact penis and its contained urethra, the clamp in fully opened condition and with part of the inflatable liner broken away.
Figure 10:
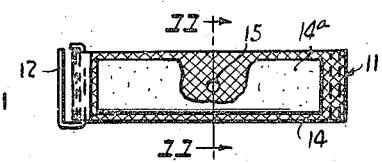
Fig. 10 is an inside elevation of the clamping ring for use on the surgically isolated male or female urethra, the clamp in fully opened condition and with part of the inflatable liner broken away.
Figure 11:
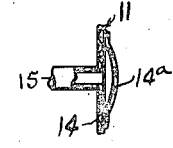
Fig. 11 is a sectional detail on line 11—11 in Fig. 10.
Figure 12:
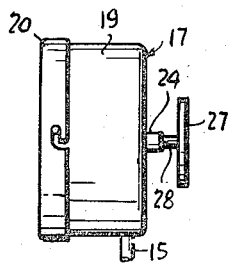
Fig. 12 is a side elevation of the control unit.

It will be seen, and with particular reference to Fig. 9 that the inflatable lining 14a of the clamping ring for use on the intact penis and its contained urethra is small in proportion to the total area of the clamping ring, the inflatable surface 14a being designed to lie in contact with only the ventral quadrant of the penile circumference overlying the urethra as shown in Fig. 4. In this way the direct pressure effected by inflation is applied to the small area overlying the urethra, as shown in Fig. 5, and is comparatively high per unit of area with the effect of firmly compressing the urethra and obliterating its lumen, while the indirect or transmitted concentric pressure, induced by inflation over the remaining large area of the clamping ring, is applied to the corpora cavernosa and is comparatively low per unit of area. This has the effect of minimizing the impediment to flow of venous blood from the cavernous bodies and a substantially less degree of erection distal to the site of clamp application than occurs with the conventional incontinence clamp in which the pressure applied to the urethra is no greater than the pressure applied to the cavernous bodies.

The distending or inflating liquid is supplied through a tube 15 attached at the peripheral surface of the collar as shown in the drawing. This tube 15 is of course flexible and of sufficient length to extend into a pocket 16, remote from the collar, and where the tube is connected to a control unit 17 that can be operated by the operator's hand in the pocket. The pocket 16 may be provided with a slit 18 so that the unit 17 may be conveniently placed in and removed from the pocket.

The control unit 17 (Figs. 1, 12, 13, 14) comprises a metal or fiber box or container 19 having a removable cover 20. This box contains a bellows or diaphragm 21, which, in the present instance, is in the form of a hollow doughnut (Fig. 15) and attaches to the pocket end of the flexible tube 15. The diaphragm 21 fits snugly within the container 17 and is interposed between one wall thereof and a circular plate 22. This plate is spring-pressed against the bellows 21 by a helical coil spring 23 which is compressed between the plate and the cover 20. A stem 24 extends from the plate 22 through the center aperture 25 in the diaphragm 21 and through a similar aperture 26 in the adjacent end wall of the container 17. The stem 24 has a control button 27 at its outer end, and immediately adjacent to this head or button 27 the stem 24 is reduced to form an annular groove or shoulder 28 which can be releasably secured to the end wall of the box by moving the button to an eccentric position when it is fully depressed. To release the stem it is only necessary to move the button toward its center or concentric position, when the stem is again free to be projected under the action of the spring 23.

Figure 13:
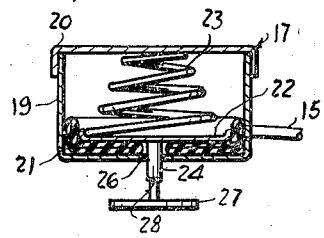
Fig. 13 is a diametrical section through the control unit with its diaphragm in deflated or contracted condition.

In the use and operation of the device the button 27 is normally in its released or extended position, and the spring 28 is of such tension that it will compress the diaphragm 21 and hold it in that condition. It wil be noted that the presser plate 22 is small enough in diameter to permit peripheral clearance beween itself and the cylindrical wall of the box for the folded portion of the diaphragm, as shown in Fig. 13.

Figure 7:
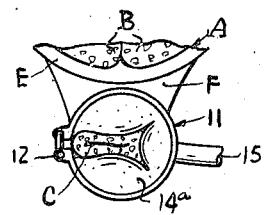
Fig. 7 is a detail view similar to Fig. 6 but showing the clamping ring inflated to constrict the urethra and thus shut off the flow of urine therethrough.

With the diaphragm or bellows 21 in its normally collapsed condition the air previously contained within it is forced through the tube 15 and into the collar 11 where it inflates the lining 14a, as indicated in Figs. 5 and 7, and thereby constricts or squeezes the circumscribed urethra to shut off the flow of urine. This condition prevails at all times until such time as evacuation of the bladder becomes necessary.

Figure 14:
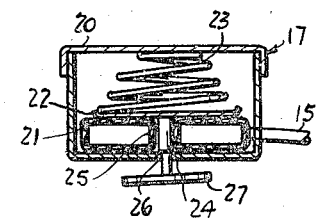
Fig. 14 is a section similar to Fig. 13 but showing the diaphragm in its inflated or expanded condition.
Figure 15:
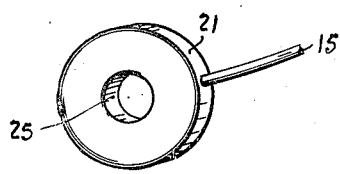
Fig. 15 is a detail perspective view of the diaphragm removed from its container.

To start the flow it is only necessary for the operator to press the button 27. This compresses the spring 28 and moves the presser plate back to permit restoration of the diaphragm to its expanded or normal shape, as shown in Fig. 14, which action in turn releases the fluid pressure in tube 15 and restores the inflated collar lining 14a to its open or urethra releasing condition as illustrated in Figs. 4 and 6.

The operator may merely hold the button depressed until evacuation has been completed, or he may releasably lock it in its inner position by moving it sidewise so that the shoulder 28 on the stem 24 may engage the recess edge of the box wall. At the desired time the button is released to permit the spring to recompress the diaphragm, thus again inflating the artificial sphincter 11 to stop passage through the urethra C.

The arrangement thus described is particularly advantageous over possible other constructions since it effectively prevents accidental deflation of the sphincter collar, and also permits the ready interchange of springs having different compression strengths to better accommodate the device to varying conditions and different people.

It will also be understood that although air appears to be the preferred pressure transfer medium other fluid mediums such as gas, oil, water or other liquid might be employed to similar advantage.

It is further to be understood that while the apparatus I have disclosed is primarily intended for use in connection with isolated sections of the urethra in male or female adults, it is not thus restricted in its use or adaption except as noted in the claims. Thus in the male, child or adult, a sphincter collar of sufficient size to encircle the entire penis with its contained urethra may be used, the urethra isolation operation being thus avoided. This form of application of the artificial sphincter is particularly suitable to involuntary urination in the male, child or adult, of which the nocturnal enuresis of childhood is an example or in temporary incontinence due to temporary incompetence of the sphincters.

For modifications and improvements in the present device reference is made to applicant's copending applications Serial No. 35,625, filed June 28, 1948, for Artificial sphincter, and Serial No. 27,422, filed May 17, 1948, for Latex molding core and method.

It will be still further understood that various modifications in my apparatus and method as herein disclosed may be made without departing from the spirit and scope of the invention as claimed. Having now therefore fully illustrated and described a preferred embodiment of the invention and explained its adaptation and use, what I desire to claim as my invention and cover by Letters Patent is:

1. A method for controlling involuntary escape of urine which comprises permanently isolating a segment of the urethra by forming a cutaneous tunnel between it and normally attached adjacent tissue, and applying a clamping element to such segment to constrict the same adjacent the tunnel and prevent the flow of urine through the segment.

2. A method for controlling involuntary escape of urine which comprises permanently isolating a segment of the urethra from normally attached adjacent tissue by forming a cutaneous tunnel between the section and such adjacent tissue, applying a clamping device through the tunnel and about the isolated segment of urethra, and controlling the clamping device from a location remote therefrom.

3. A method for controlling involuntary escape of urine in males which comprises the steps of providing the penis with a transverse cutaneous tunnel opening between the urethra and corpora cavernosa to permanently isolate a section of the urethra therefrom, encircling the isolated section of urethra with a clamping device inserted through the opening and then actuating said clamping device to constrict the urethra and close the passage therethrough.

4. A method for controlling involuntary escape of urine in females which comprises the steps of providing a transverse cutaneous tunnel of vaginal wall and mucous membrane, opening between the urethra and pubic arch, to permanently isolate a section of the urethra from the ventrally placed surrounding structures, encircling the isolated section of urethra with a clamping device inserted through the tunnel and then actuating said clamping device to constrict the urethra and close the passage therethrough.

5. An artificial sphincter for controlling the involuntary escape of urine comprising a hollow urethra encircling member that is radially inwardly expansible under fluid pressure to clamp the urethra closed, a fluid pressure device connected to the member by an elongated flexible tube that will permit the device to be moved about with respect to said member, and which will permit the device to be operated at a point substantially remote from the urethra encircling member, said fluid pressure device having a fluid chamber that is in constant communication with the interior of the urethra encircling member through said flexible tube, and manually operative means for effectively increasing and decreasing the size of said chamber to thereby control the flow of fluid to and from the urethra encircling member.

6. Apparatus for controlling involuntary escape of urine comprising a fluid actuated artificial sphincter forming a urethral clamp adapted to engage the urethra separate and apart from the main body portion of the penis and to constrict the urethra to close passage therethrough, and manually operative means remote from the sphincter and connected thereto by an elongated flexible tube for operating the same to open and close the clamp, the actuating fluid being of constant volume and confined within the apparatus.

FREDERIC E. B. FOLEY.

REFERENCES CITED

The following references are of record in the file of this patent:

UNITED STATES PATENTS

| Number | Name | Date |
|---|---|---|
| 1,127,948 | Wappler | Feb. 9, 1915 |
| 1,225,000 | Bartlett | May 25, 1916 |
| 1,827,241 | Kempf | Oct. 24, 1929 |
| 1,970,042 | Brathwaite | July 11, 1932 |
| 2,045,750 | Buschenfeldt | June 30, 1936 |

FOREIGN PATENTS

| Number | Country | Date |
|---|---|---|
| 21,538 | Great Britain | Sept. 21, 1912 |
| 154,651 | Switzerland | Oct. 28, 1930 |